Sept. 22, 1970  J. R. BREY  3,530,431
PRECISION HIGHLINE PICKUP REMOVAL FROM A RECORDED SEISMIC TRACE
Original Filed May 16, 1966  2 Sheets-Sheet 1

INVENTORS
JAMES R. BREY
ATTORNEY

INVENTORS
JAMES R. BREY

ATTORNEY

United States Patent Office 3,530,431
Patented Sept. 22, 1970

3,530,431
PRECISION HIGHLINE PICKUP REMOVAL FROM A RECORDED SEISMIC TRACE
James R. Brey, Irving, Tex., assignor to Texas Instruments Incorporated, Dallas, Tex., a corporation of Delaware
Continuation of application Ser. No. 550,315, May 16, 1966. This application Apr. 10, 1969, Ser. No. 816,173
Int. Cl. G01v 1/28
U.S. Cl. 340—15.5          12 Claims

ABSTRACT OF THE DISCLOSURE

Apparatus and a method of removing highline pickup components from a phonographically recorded seismic trace wherein crosscorrelation functions and autocorrelation functions are employed in the synthesis of a filter uniquely related to the seismic trace. The correlation functions are fed into a computer to determine the weights of signals in a seven point time-domain filter to be summed in an output unit. The combined signal from the output unit may then be mixed, with phase reversal, with a seismic signal having undesirable pickup recorded therewith to cancel the pickup component thereby producing a signal which can be either stored or recorded as a wiggle trace or other visible recording.

---

This application is a continuation of application Ser. No. 550,315, now abandoned.

This invention relates to seismic exploration and more particularly to the removal of highline pickup by use of a cross-equalization filter uniquely related to each seismic trace in dependence upon autocorrelation and crosscorrelation signals.

The presence of highline pickup components in seismic traces has been found to cause serious errors in results produced by data reduction methods. The highline pickup components generally are at power frequencies. They generally cannot be eliminated by standard field procedures. Such pickup components in a seismic recording are undesirable because they may obscure seismic signals. They are particularly troublesome if advanced digital processing techniques, such as currently in use, are applied to the seismic traces. Therefore removal of the pickup components without distorting the seismic signals is highly desirable.

The ability to remove power frequency pickup components from seismic signals with which they are mixed depends upon several characteristics. The pickup components can be considered to be a mixture of a sine wave function and one or more of its harmonics. Each seismic trace on a seismic record can be thought of as the sum of two independent signals, the seismic signal and the pickup signal.

In prior systems designed for highline pickup removal, the relative amplitude scale factors and phase shifts between a recorded pickup trace and the pickup component in seismic traces have been determined. Such scale factors and time shifts were then applied to the pickup trace and the results were then subtracted from the seismic trace. Heretofore the phase shift has been determined from the crosscorrelation between the pickup trace and the data trace. This yields the time shift which, in digital processing, is a multiple of the sample period at which the traces were recorded. It has been found that if the true phase shift is not a multiple of the sample period the result will be degraded because the highline pickup component will not have been subtracted in phase. This undesirable effect becomes proportionately enhanced as the recording sample period increases. Furthermore, the phase shift determined in accordance with prior methods is the phase existing between a dominant correlated energy between the two traces. This dominant energy generally will be the fundamental frequency of the pickup voltage. Thus, while the phase shift may be closely approximated for the fundamental frequency, within the limits of accuracy set by the sample period, it may not be the proper phase shift for any harmonics which may be present. Thus, highline pickup harmonics will not be removed and could be reinforced.

The present invention overcomes the foregoing problems. It involves the use of a crossequalization filter having a phase response such that all the correlated energy between the sample trace and respective data traces is in-phase and is properly scaled.

More particularly in accordance with the present invention, a seismogram having a plurality of seismic traces thereon is treated for removal of highline pickup from such seismic traces by generating an autocorrelation function X of a highline pickup trace and generating a crosscorrelation function Z between said pickup trace and a high gain portion of the seismic trace. The pickup signal is time domain filtered with relative amplitudes proportional to $(Y_m)$ in the matrix $(Y_m)X=Z$ to tailor the pickup trace to correspond with the pickup component in the seismic trace. The tailored pickup trace is then subtracted from said seismic trace.

For a more complete understanding of the present invention and for further objects and advantages thereof, reference may now be had to the following description taken in conjunction with the accompanying drawings in which.

Figure 1:
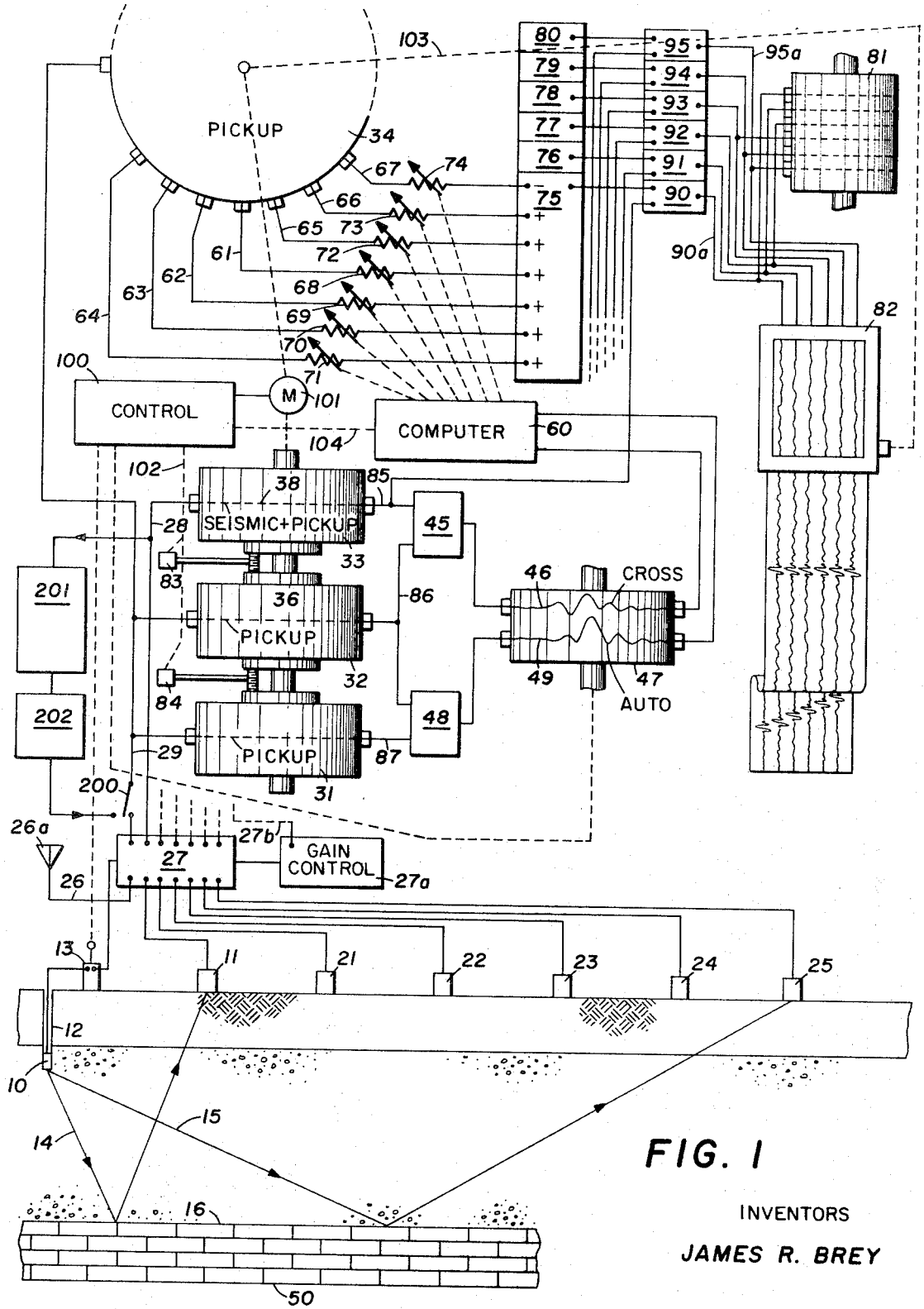
FIG. 1 is a diagrammatic view of a system embodying the present invention.

Referring now to FIG. 1, in usual practice, a charge of dynamite 10 is detonated in a borehole 12 by actuation of a blaster 13 to initiate seismic waves which travel in all directions from the source. The ray paths 14 and 15 represent the primary reflection from a subsurface reflector 16 to detectors 11 and 25, respectively.

By reason of the use of cables and other system components in contact with and adjacent to the ground, all in the presence of fields produced by flow of currents at power frequencies in and on the earth's surface, an unwanted pickup signal often is present in the lines leading from detector 11 to the amplifiers 27 of such magnitude as to seriously hamper the processing of the seismic signals.

In accordance with the present invention a highline pickup or reference signal induced on channel 26 is applied to the amplifiers 27. Channel 26 may include a suitable antenna 26a. The highline pickup signal thus produced is employed in accordance with the present invention for eliminating a highline pickup component of the signal on the detector output channels including the channel leading from detector 11.

For the purpose of the present description, a relatively simple example of problems thus presented will be employed. More particularly the signal output from the detector 11 will be treated in detail. It should be kept in mind, however, that ordinarily, a seismic spread includes many detectors, such as detectors 21–25. A multi-element spread is employed so that a suite of seismic signals will be produced to determine the presence of reflected energy on the resultant seismic traces generally identified by reason of the coincidence in the time occurrence of like high amplitude signals.

Output signals from the spread detectors 11 and 21–25 are applied to an amplifier system 27 and then are stored for processing. The output signal from the detector 11 and the pickup signal from channel 26 will now be considered in detail with the understanding that signals from the remaining detectors will similarly be processed in conjunction with the pickup signal on channel 26.

The output signal from detector 11 is applied by way of conductor 28 to drum 33 of a processing system which, in the form illustrated, includes four drum storage units 31–34. The pickup signal is applied by way of channel 29 to drums 31, 32 and 34.

In the analog process employed in FIG. 1, the signals stored on drums 31–33 are employed for the purpose of synthesizing a filter which will tailor the pickup signal uniquely for cancellation of the pickup component in the seismic trace on drum 33. Synthesis of a proper crossequalization filter involves the autocorrelation of the pickup signal 36 and the crosscorrelation thereof with the seismic signal 38.

The crosscorrelation function for signals 36 and 38 is produced at the output of multiplier-integrator 45 and the resultant crosscorrelation function 46 is stored on a drum 47. The autocorrelation function 49 of the pickup signal 36 is produced from signals stored on both drums 31 and 32. Function 49 is produced at the output of multiplier-integrator 48 and is stored on drum 47. The crosscorrelation and autocorrelation operations for producing the functions 46 and 49 are carried out over a seismic trace interval or window at a late, or high gain, record time where pickup may dominate.

Crosscorrelation and autocorrelation operations in general are well known in the treatment of seismic signals and, for this reason, the systems have been shown in block form. The systems may be of the analog type represented in FIG. 1 with a more general description being found in Pat. No. 2,927,656, columns 5 and 6, and in Pat. No. 3,131,375. The present invention involves the use of the correlation operations for characterizing and eliminating the pickup energy from the seismic traces.

Crosscorrelation functions and autocorrelation functions are employed to synthesize a filter uniquely related to the trace from detector 11. The correlation functions are fed into a computer 60 which sets the values, for example, of resistances 68–74 in the output lines 61–67 leading from the storage drum 34 which serves as an element of a seven point time-domain filter.

With the pickup signal 36 stored on the drum 34 for playback purposes, the computer 60 determines the weights of the signals to be summed in an output unit 75. The output from unit 75 may then be mixed, with phase reversal, with the signal on channel 85 in cancellation unit 90 to cancel the pickup component and the result either stored in reproducible form on a storage drum 81, or recording as a wiggle trace or other visible recording produced by recorder 82.

As described thus far, only the signal from detector 11 has been referred to. However, twelve-trace and 24-trace recordings are conventionally employed. In the present case, the drums 31–34 may be multiple channel drums so that signals from detectors 21–25 etc. may be treated. The computer 60 may be employed successively to evaluate and synthesize the filters in the additional channels (not shown) leading from the delay line drum 34 to the summing units 76–80. A different crossequalization filter is employed for tailoring the pickup signal to be subtracted from each seismic trace. The tailored output pickup signals from summing units 75–80 are applied to the cancellation units 90–95. The outputs of cancellation units 90–95 are then applied to the storage unit 81 and to the recorder 82 by way of channels 90a–95a. It is to be understood that a plurality of drums, i.e., drums 31–34, 47 and 81, have been included in order to illustrate the functions involved. Some of the functions of FIG. 1 may be combined on or carried out in connection with use of a single drum without departing from the teachings of the present invention. Furthermore, while an analog system has been described, it is to be understood that the seismic traces and the pickup trace may be stored in registers in digital computer storage systems rather than on drums 31–34.

The generation of the seismic waves, as by detonation of the explosive charge 10 under the control of blaster 13, may be taken illustrative of well-known techniques. The generation of the seismic waves may be under the supervisory control of a unit 100 which controls the operations of the storage drums 31–34, computer 60 and the drums 47, 81 and recorder 82. By this means, the signals may be recorded in predetermined relation to the shot instant. Such control systems are well known, a suitable system being described in U.S. Pat. No. 3,039,558 to Romberg.

It will be preferable to carry out pickup removal as above described before making dynamic spread corrections. This is because in dynamic spread corrections the time occurrences of events on one trace are modified differently than on any other trace. Desired signal components of the trace 38 on drum 33 are time and space dependent whereas the pickup signal is not time and space dependent. Pickup removal could be done after dynamic spread correction with suitable provisions being made for the individual changes in the traces. It is less complex to remove pickup before making any dynamic spread corrections.

As shown in FIG. 1, the control unit 100 is connected as to energize the motor 101 which may produce uniform rotation of the drums 31–34 and 81. The control unit 100 is coupled by way of linkage 102 to time shifting units 83 and 84 and to the drive for the drum 47. The linkage 102 is a stepping linkage to shift drum 32 relative to drum 33 an increemnt $\tau$ at the beginning of each playback cycle. Drum 31 is shifted relative to drum 32 by a similar increment. By this means, the points on the correlation functions 46 and 49 may be stored on drum 47 which is stepped synchronously with the shifting units 83 and 84.

The linkage 103 leading to drum 81 and recorder 82 may be actuated only when the time domain filter operation is to be carried out following the synthesis of the time domain filters. However, the linkage has been shown unbroken merely for the purpose of indicating the coordination between the several drums involved. The linkage 104 couples control unit 100 to the computer 60 for coordination of the synthesis of the filter weights.

In producing the correlation functions 46 and 49, the signals initially are recorded on drums 31–34. Thereafter, the signals 36 and 38 are cyclically reproduced. During a first cycle, the signals appearing on the output lines 85 and 86 are multiplied and the product is integrated in unit 45 over the length of the selected record time to produce one point on the crosscorrelation function 46. Similarly, signals on the lines 86 and 87 are multiplied and integrated in the unit 48 to produce one point on the autocorrelation function 49. Prior to the second cycle, the shifting units 83 and 84 are actuated to shift the drums by a time increment $\tau$. During the second cycle, a second point on the crosscorrelation function 46 and a second point on the autocorrelation function 49 are determined. The drums are then successively shifted by increments of $\tau$ to cover the selected correlation window. The time increment $\tau$ may be within the range of from 1 to 5 milliseconds and preferably is of the order of about 2 milliseconds but may vary depending upon the frequency band width desired. The computer 60 will evaluate, for each of the delay intervals, the weight for one of the signals to be included in the input to the summing unit 75.

The system of FIG. 1 embodies one of two options available in this invention. Selection between the options depends on how the pickup trace is recorded. In FIG. 1, in accordance with the first option, the pickup trace is passed through one of a bank of gain modulated seismic amplifiers before it is recorded. The pickup trace thus has the same gain applied to it as the pickup component in the seismic traces. The need to compensate for gain in the process is thus eliminated.

The second option eliminates the necessity of recording a sample of the pickup energy at the time the seismic traces are recorded. A gain control unit 27a controls the gain of amplifiers 27. The gain control signal is recorded as by a channel 27b.

Any one of several known processes is employed to determine the fundamental frequency of the pickup energy in the seismic trace. This is done by analyzing preferably the frequency spectrum of the later or high gain portion of the seismic trace where the seismic energy is presumably weakest and the highline component strongest. Only the portion of the spectrum in the region of the fundamental highline frequency is analyzed, e.g., near 60 c.p.s. With the fundamental frequency determined, the process generates a signal composed of the fundamental frequency and the first three harmonics. This signal, modified in accordance with the gain function on channel 27b, is then used as the sample trace as described above.

The selection of the foregoing two options is provided in FIG. 1 by the selector switch 200. A late time gate from the seismic trace 38 is applied to a frequency analyzer 201. The analyzer 201 controls a signal generator 202 which generates and applies the pickup signal to drums 31, 32 and 34 through switch 200. In the other position of switch 200, the pickup signal is transmitted from the channel 26 directly to drums 31, 32 and 34.

This system of FIG. 1 operates to transform the pickup trace into a signal having the same form as the pickup present in a given seismic trace. With a cancellation signal thus produced, it is applied to a cancellation unit in phase opposition to the seismic trace so that the highline pickup is removed.

Where the two time series 36 and 38 may be designated as $u(t)$ and $v(t)$, the following expressions are applicable to the problem of synthesizing the filter $g(t)$:

$$u(t) = f(t) + n(t) \quad (1)$$
$$v(t) = g(t) + n'(t) \quad (2)$$
and
$$g(t) = f(t) * h(t) \quad (3)$$

where $n(t)$ and $n'(t)$ are incoherent noise functions. From this, the optimum linear filter for transforming $u(t)$ into $v(t)$, or equivalently, for transforming $f(t)$ into $g(t)$ in the presence of noise, may be synthesized.

More particularly, the optimum linear filter is the cross-equalization filter, which is a time domain filter corresponding with the solution to the equation $$\sum_{m=\infty}^{0} X \cdot Y_m = Z \quad (4)$$

for a set of filter weights, $Y_m$. The filter weights $Y_m$ satisfy the above equation (in the least-mean-error sense) for all values of $\tau$ where X is the autocorrelation matrix for function 49, $Y_m$ is the matrix for the filter function $g(t)$ and Z is the matrix for the crosscorrelation function 46.

The filtering operation illustrated in FIG. 1 involves a time domain filter unit including drum 34 in which the amplitude of the signal from each of the pickup points on the storage drum is selectively attenuated by units 68–74, following which the signals are summed in unit 67. A servo system in computer 60 may be employed to adjust units 68–74, such as in the magnetic delay line filter described by Hal J. Jones et al. in a paper entitled "Magnetic Delay Line Filtering" in Geophysics, vol. XX, October 1955, page 745 et seq. In the latter case, the components of the signal are controlled in amplitude by a variable resistance in each signal line. Alternatively, an amplifier may be substituted for variable resistors 68–74 and the gains of the amplifiers may be controlled by gain control voltages generated in the computer 60. Such gain control voltages from the computer 60 produced from treatment of the crosscorrelation and autocorrelation functions may thus be used to control the weights of signals on channels 61–68.

The computer 60 and its mode of operation may best be understood by referring to the relationships expressed in Equation 5 which indicated that the autocorrelation signal X, when treated by a filter $Y_m$, will result in a crosscorrelation signal Z. Computer 60 inverts the matrix X and solves the resulting expression for the seven values or weights to be given the signals applied to the summing unit 75. By way of example, Equation 5 in matrix form for a seven-point operator or filter $Y_m$ may be written:

$$\begin{bmatrix} X0 & X1 & X2 & X3 & X4 & X5 & X6 \\ X(-1) & X0 & X1 & X2 & X3 & X4 & X5 \\ X(-2) & X(-1) & X0 & X1 & X2 & X3 & X4 \\ X(-3) & X(-2) & X(-1) & X0 & X1 & X2 & X3 \\ X(-4) & X(-3) & X(-2) & X(-1) & X0 & X1 & X2 \\ X(-5) & X(-4) & X(-3) & X(-2) & X(-1) & X0 & X1 \\ X(-6) & X(-5) & X(-4) & X(-3) & X(-2) & X(-1) & X0 \end{bmatrix} \begin{bmatrix} Y(-3) \\ Y(-2) \\ Y(-1) \\ Y0 \\ Y1 \\ Y2 \\ Y3 \end{bmatrix} = \begin{bmatrix} Z(-3) \\ Z(-2) \\ Z(-1) \\ Z0 \\ Z1 \\ Z2 \\ Z3 \end{bmatrix} \quad (5)$$

where:

X0, $X(-1)$, $X(-2)$, $X(-3)$, $X(-4)$, $X(-5)$, $X(-6)$, X1, X2, X3, X4, X5, and X6 are the numerical values of the autocorrelation function 49 at a time delay $\tau = 0, -1, -2, -3, -4, -5, -6, 1, 2, 3, 4, 5,$ and 6, respectively.

Z0, $Z(-1)$, $Z(-2)$, $Z(-3)$, Z1, Z2, and Z3 are the numerical values of the crosscorrelation function 46 at time delays $\tau = 0, -1, -2, -3, 1, 2,$ and 3, respectively.

As to the remaining elements of the matrix $Y(-1)$, $Y(-2)$, $Y(-3)$, Y0, Y1, Y2, and Y3 are the filter weights of the elements in lines 61, 62, 63, 64, 65, 66, and 67, respectively.

In order to solve Equation 5 for the values of the filter points at the delay intervals $\tau = (-3), (-2), (-1), 0, 1, 2,$ and 3, the X matrix of Equation 5 is inverted and the solution is then formulated for each of the seven filter points. The operation mathematically is indicated in Equation 6.

$$\begin{bmatrix} Y(-3) \\ Y(-2) \\ Y(-1) \\ Y0 \\ Y1 \\ Y2 \\ Y3 \end{bmatrix} = \begin{bmatrix} X \end{bmatrix}^{-1} \begin{bmatrix} Z(-3) \\ Z(-2) \\ Z(-1) \\ Z0 \\ Z1 \\ Z2 \\ Z3 \end{bmatrix} \quad (6)$$

The inversion of Equation 5 to Equation 6 may be undertaken in accordance with any one of several well-known techniques, of which the Crout reduction technique is exemplary. By this means, the unknown $Y_m$ quantities may be evaluated for each delay interval of interest. More particularly, signals are produced, one for each delay interval, and are applied to unit 75, FIG. 1, to control the amplitudes of the signals from delay line drum 34 prior to addition in unit 75. Where a delay interval $\tau = 0.002$ second is employed in the production of the crosscorrelation function 46 and the autocorrelation function 49, the spacing of detector heads on drum 34 will be equal to 0.002 second record time.

Figure 2:
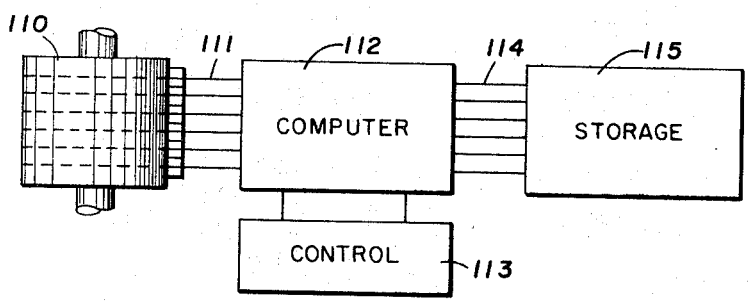
FIG. 2 illustrates a digital filter process.

Operations generally involve 12 and 24-trace recordings. Time domain filters having 5 to 7 or more delay intervals or points will be satisfactory. It will be apparent that, for such operations, the computations for such a number of equation like matrix Equation 5 become extensive. Such matrices are most expeditiously evaluated and filter point signals produced in digital computers having large data-handling capacity. In FIG. 2, multi-trace seismic and pickup signals are stored on drum 110 and are reproduced and applied by way of channels 111 to computer 112. The computer 112 is programmed under the control of a unit 113 to determine, adjust or fix and apply the filter corresponding with the solution to Equation 4 to the seismic traces. The computer 112 will then produce on output channels 114 the seismic signals filtered for pickup removal. The latter signals are then applied to a storage unit 115 shown in the form of a magnetic drum storage unit. Storage may be temporary electronic storage, or alternative forms of readout may be employed, including the production of a visible or wiggle trace seismogram.

Figure 3:
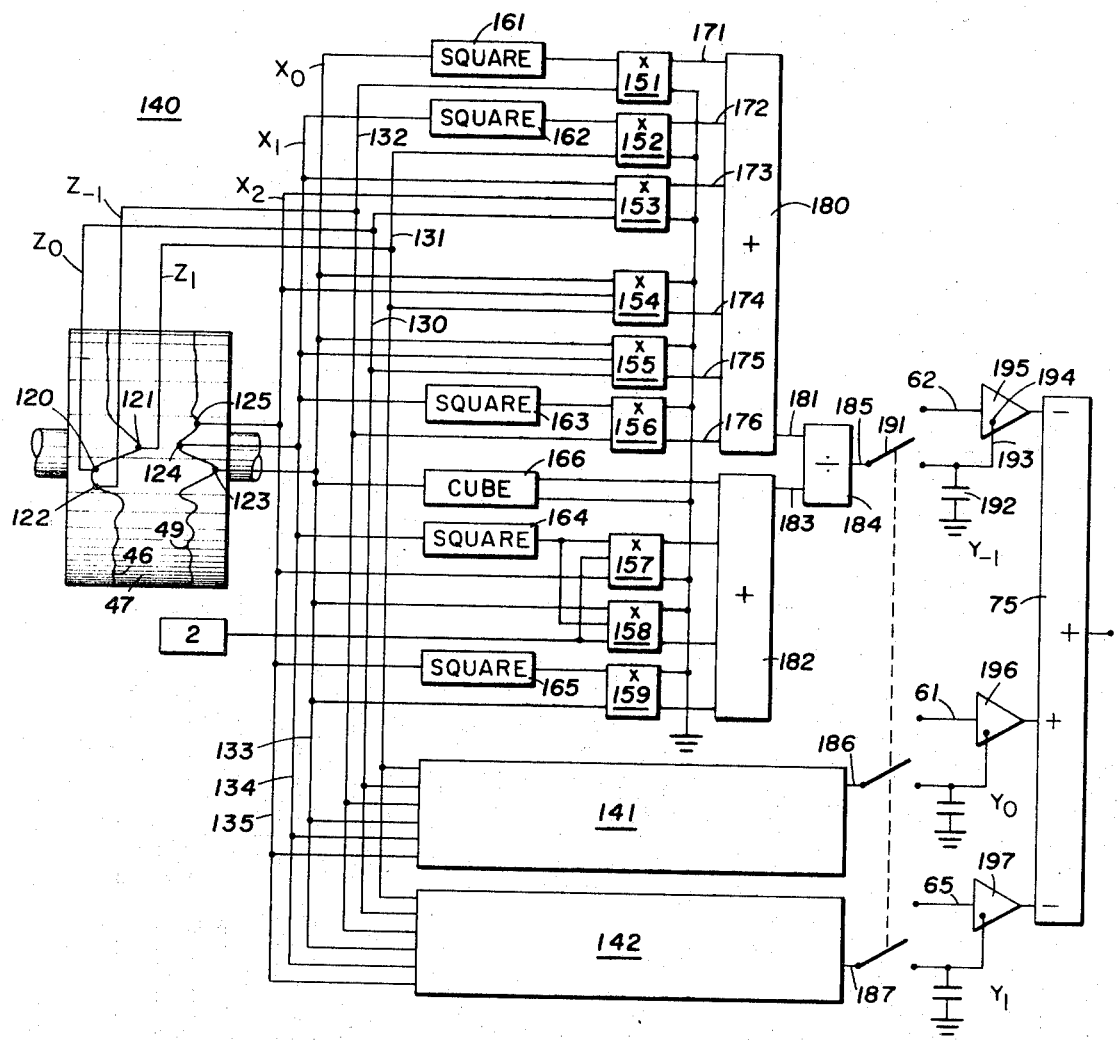
FIG. 3 illustrates one form of the analog computer of FIG. 1.

The operation may be carried out in the system of FIG. 3 in accordance with well-known systems and methods of operating the same but guided by the requirements of the method set forth herein. Digital filtering, in general, is well known as indicated in "Principles of Digital Filtering" by Robinson and Treitel, Geophysics, vol. XXIX, No. 3, June 1964, pp. 395-404. Thus, the control unit 113 of FIG. 2 may readily be programmed to carry out the operation indicated in Equation 4.

While the analog filtering operation illustrated in FIG. 1 may be employed, when large sets of data and the mult-point filters are involved, a digital computer operation will be preferred.

In order to further illustrate the operation of the computer of FIG. 2, as well as to further explain the invention, the analog computer operation is further developed in FIG. 3. The computer 60 of FIG. 1 may take the form illustrated in FIG. 3 for a simplified three-point filter. The same principles illustrated in FIG. 3 would be involved for the seven-point filter of FIG. 1 or for more complex filters should they be desired.

The crosscorrelation function 46 and the autocorrelation function 49 are stored on drum 47. For the purpose of the present description, representations of the crosscorrelation function 46 and the autocorrelation function 49 have been illustrated together with pickup devices for reproducing the data stored on the drum 47. The pickup 120 produces a signal representative of the crosscorrelation function at time $\tau=0$ for the function Z0 of Equation 5. The signals from pickups 121 and 122 correspond with the elements Z1 and $Z(-1)$ of Equation 5. Signals from pickups 123, 124 and 125 correspond with the elements X0, X1, and X2 of Equation 5.

Where the autocorrelation function 49 is symmetrical, the values X1 and X2 correspond with the values $X(-1)$ and $X(-2)$, respectively. Thus, for a solution to Equation 5, but limited to a three-point filter, the necessary correlation signal data appears on the readout busses 130–132 and 133–135.

The solution to Equation 5, limited a three-point filter, is indicated in Equations 7, 8, and 9. Equation 7 defines the magnitude of the signal to be applied from channel 62, FIG. 1, to summing unit 75. Equation 8 represents the magnitude of the signal to be applied by way of channel 61, and Equation 9 represents the relative magnitude of the signal to be applied by way of channel 65.

$$Y(-)=\frac{\begin{bmatrix} Z(-1) & X1 & X2 \\ Z0 & X0 & X1 \\ Z1 & X1 & X0 \end{bmatrix}}{\begin{bmatrix} X0 & X1 & X2 \\ X1 & X0 & X1 \\ X2 & X1 & X0 \end{bmatrix}} \quad (7)$$

$$Y0=\frac{\begin{bmatrix} X0 & Z(-1) & X2 \\ X1 & Z0 & X1 \\ X2 & Z1 & X0 \end{bmatrix}}{[D]} \quad (8)$$

$$Y1=\frac{\begin{bmatrix} X0 & X1 & Z(-1) \\ X1 & X0 & Z0 \\ X2 & X1 & Z1 \end{bmatrix}}{[D]} \quad (9)$$

$$Y(-1)=\left\{\frac{\begin{bmatrix} X0^2 Z(-1)+X1^2 Z1+X1 X2 Z0 \\ -Z1 X0 X2 - X1 X0 Z0 - Z(-1) X1^2 \end{bmatrix}}{[D]}\right\} \quad (10)$$

where:

$$D=[X0^3+2X1^2X2-2X0X1^2-X0X2^2]$$

$$Y0=\left\{\frac{\begin{bmatrix} X0^2 Z0 + Z(-1) X1 X2 + X1 X2 Z1 \\ -X2^2 Z0 - X0 X1 Z(-1) - X0 X1 Z1 \end{bmatrix}}{[D]}\right\} \quad (11)$$

$$Y1=\left\{\frac{\begin{bmatrix} X0^2 Z1 + X1 X2 Z0 + X1^2 Z(-1) \\ -X0 X2 Z(-1) - X1^2 Z1 - X0 X1 Z0 \end{bmatrix}}{[D]}\right\} \quad (12)$$

The operations illustrated in FIG. 3 may readily be performed for an inverted matrix by analog means so long as accuracy is maintained. Only addition, multiplication and division of voltages are involved in the operation of the computer of FIG. 3. The solutions to the Equations 7–9 are expressed in Equations 10–12 which should be considered along with FIG. 3. The portion of the computer of FIG. 3 for computing the value of the filter point $Y(-1)$ has been illustrated in detail in the channel 140 of FIG. 3. Channels 141 and 142 are employed for obtaining the values for the filter points Y0 and Y1.

Channel 140 involves nine multipliers, 151–159. The units 151–156 and the associated circuits are employed to provide the solution to the numerator of Equation 10. The multipliers 157–159 are employed to provide a solution to the denominator of Equation 10.

A squaring unit 161 is connected to one input of the multiplier 151. A squaring unit 162 is connected to one input of the multiplier 152. A squaring unit 163 supplies one input of multiplier 156. A squaring unit 164 supplies one input of multiplier 157, and a squaring unit 165 supplies one input of multiplier 159. A unit 166 produces an output which is the cube of the input signal applied thereto.

The input to the squaring unit 161 is connected to the X0 bus 133. The second input to the multiplier 151 is connected to $Z(-1)$ bus 132. Thus, there is produced an output on line 171 proportional to the quantity $X0^2Z(-1)$.

The input to the squaring unit 162 is connected to the X1 bus 134. The second input to the multiplier 152 is connected to the Z1 bus 131. Thus, there is produced on output line 172 a voltage representative of the quantity $X1^2Z1$ of Equation 10.

In a similar manner, the output on line 173 is produced representing the third element of the numerator of Equation 10, namely the quantity X1X2Z0. The voltage on line 174 is produced representative of the fourth element of the numerator of Equation 10, namely the quantity Z1X0X2. The voltage on line 175 is representative of the fifth element of the numerator of Equation 10, namely the quantity X1X0Z0. The signal on line 176 is representative of the sixth or last element of the numerator of Equation 10, namely the quantity $Z(-1)X1^2$.

Thus, the output from the summing unit 180 appearing on the channel 181 is representative of the value of the numerator of Equation 10.

Voltages are applied from the cube unit 166 and the multipliers 157, 158 and 159 to a summing unit 182. The output voltage from the summing unit 182 appearing on channel 183 represents the denominator of Equation 10.

The signals on channels 181 and 183 are applied to a dividing unit 184. Thus, the output of the unit 184, as appearing on output channel 185, represents the solution to Equation 10.

The solution to Equation 11 is represented by a voltage appearing on the output channel 186 of the computer channel 141. A voltage representing the solution to Equation 12 appears on output channel 187 of the computer channel 142.

The channel 185 is connected by way of a switch 191 to a storage capacitor 192 which is connected to ground and, by way of a conductor 193, to a gain control input terminal 194 of an amplifier 195. In this system, an amplifier 195 in line 62 replaces the variable resistance 69 of FIG. 1 so that the signal from the delay drum 34 of FIG. 1 will be amplified in proportion to the gain control voltage stored on capacitor 192 upon closure of switch 191. In a similar manner, control voltages are applied to amplifiers 196 and 197 representing the values of the solutions to Equations 11 and 12. Amplifier 196 may be considered as substituted for the impedance 68 of FIG. 1 and channel 61. The amplifier 197 may be considered as substituted for the resistance 72 in line 65 of FIG. 1. Thus, the output signals from the amplifiers 195, 196 and 197 are applied to the inputs of the summing unit 75 of FIG. 1 with the instantaneous polarities of the voltages from amplifiers 195 and 197 opposite the polarity of the output voltage from amplifier 196.

The inversion of the equations discussed in connection with Equations 5 and 6 has been illustrated in connection with Equations 7, 8, and 9 for a simple 3 x 3 matrix. The inversion of more complex matrices can be accomplished in accordance with the pattern indicated in Equations 7–9. It has been indicated that the Crout reduction technique is exemplary of well-kown techniques for minimizing the difficulty in inversion of large matrices. The Crout reduction technique is discussed in Methods of Applied Mathematics by F. B. Hildebrand, Prentice-Hall, Inc. (1958) in the appendix, pages 503–507.

Having described the invention in connection with certain specific embodiments thereof, it is to be understood that further modifications may now suggest themselves to those skilled in the art and it is intended to cover such modifications as fall within the scope of the appended claims.

What is claimed is:

1. The method of removing highline pickup components from a seismic trace recorded in phonographically reproducible form, which comprises:
   (a) a generating an autocorrelation function signal X by autocorrelating in an automated signal processing means a pickup trace having the same dominant frequency components as the pickup components in said in said seismic trace,
   (b) generating a cross correlation function signal Z by crosscorrelating in an automated signal processing means said pickup trace with a high gain time segment of said seismic trace,
   (c) producing by automated signal processing means a cancellation signal through summation of a plurality of weighted signals generated by time domain filtering in said processing means said pickup trace with relative amplitude and phase specified by $(Y_m)$ in the matrix $(Y_m)X=Z$, and
   (d) substractively combining said cancellation signal and said trace to produce an output seismic trace free from pickup signal components.

2. The method of removing highline pickup components from a seismic trace recorded along with a pickup trace in phonographically reproducible form, which comprises:
   (a) producing by automated signal processing means a cancellation signal through summation of a plurality of weighted signals generated by said processing means by applying to said pickup trace a time domain filter $(Y_m)$ to transform said pickup trace into said plurality of weighted signals corresponding in phase, amplitude and frequency content with the pickup components of said seismic trace wherein said filter is uniquely identified by the autocorrelation X of said pickup trace and the crosscorrelation Z of said pickup trace and said seismic trace in the relationship $(Y_m)X=Z$, and
   (b) combining by automated signal processing means said cancellation signal and said seismic trace with one of them reversed in polarity for cancelling said pickup components from said seismic trace.

3. The method of removing highline pickup components from a seismic trace recorded along with a pickup trace in phonographically reproducible form, which comprises:
   (a) generating an autocorrelation function signal X by autocorrelating in an automated signal processor said pickup trace,
   (b) generating a crosscorrelation function signal Z by crosscorrelating in an automated signal processor said pickup signal trace with a time segment of said seismic trace in which the ratio of pickup signal to seismic signal is high,
   (c) producing a cancellation signal by an automated signal processor which sums plurality of weighted signals generated by said processor by time domain filtering said pickup trace with relative amplitude and phase specified by $(Y_m)$ in matrix $(Y_m)X=Z$, and
   (d) combining said cancellation signal and said trace, with one of them reversed in polarity, to produce an output seismic trace free from pickup signal components.

4. A system for removing highline pickup components from a seismic trace recorded along with a pickup trace in phonographically reproducible form, which comprises:
   (a) automated means for autocorrelating said pickup trace to generate an autocorrelation signal X,
   (b) automated means for crosscorrelating said pickup trace with a high gain time segment of said seismic trace to generate a crosscorrelation signal Z,
   (c) an adjustable time domain filter means, said filter being adjusted responsive to said signal X and said signal Z to provide amplitude and phase relations as specified by $(Y_m)$ in the matrix $(Y_m)X=Z$,
   (d) automated means for applying said filter to said pickup trace to produce a plurality of weighted signals,
   (e) automated means for summing said plurality of weighted signals to produce a cancellation signal, and
   (f) automated means for subtractively combining said cancellation signal and said trace to produce an output seismic trace free from pickup signal components.

5. The method of removing highline pickup components from a seismic trace recorded in phonographically reproducible form, which comprises:
   (a) generating by automated signal processing means a first electrical signal representing an autocorrelation function X through autocorrelation of a pickup trace having the same dominant frequency components as the pickup components in said seismic trace,
   (b) generating by automated signal processing means a second electrical signal representing a crosscorrelation function Z through crosscorrelation of said pickup trace with a high gain time segment of said seismic trace,
   (c) producing a plurality of weighted electrical signals by automated signal processing means through time delay filtering said pickup trace with the relative amplitude and phase of each weighted signal $(Y_m)$ specified by the matrix $(Y_m)X=Z$,
   (d) producing a third electrical signal representative of a cancellation function by automated signal processing means through summation of said plurality of weighted electrical signals, and
(e) combining said cancellation signal and said trace, with one of them reversed in polarity, to produce an output seismic trace free from pickup signal components.

6. The method of removing highline pickup components from a seismic trace recorded along with a pickup trace in phonographically reproducible form, which comprises:
(a) generating by an automated signal processor a plurality of weighted electrical signals by applying to said pickup trace a time domain filter function $(Y_m)$ wherein said filter is uniquely identified by the autocorrelation X of said pickup trace and the crosscorrelation Z of said pickup trace and said seismic trace in the relationship $(Y_m)X=Z$,
(b) producing by an automated signal processor an electrical signal representative of a cancellation function by summing said plurality of weighted electrical signals to transform said pickup trace into a trace corresponding in phase, amplitude and frequency content with the pickup components of said seismic trace, and
(c) combining said cancellation signal and said seismic trace with one of them reversed in polarity for cancelling said pickup components from said seismic trace.

7. The method of removing highline pickup components from a seismic trace recorded along with a pickup trace in phonographically reproducible form, which comprises:
(a) generating a first electrical signal representing an autocorrelation function X by autocorrelating said pickup trace in an automated signal processor,
(b) generating a second electrical signal representing a crosscorrelation function Z by crosscorrelating said pickup signal trace with a time segment of said seismic trace in which the ratio of pickup signal to seismic signal is high in an automated signal processor,
(c) synthesizing a time domain filter function with a plurality of weighted electrical signals by filtering said pickup trace in an automated signal processor with the relative amplitude and phase of the weighted signals $(Y_m)$ specified by the matrix $(Y_m)X=Z$,
(d) generating a third electrical signal representative of a cancellation function by summing said plurality of weighted electrical signals in an automated signal processor, and
(e) subtractively mixing said cancellation signal and said trace to produce an output seismic trace free from pickup signal components.

8. The method of processing seismological and seismic data in an automated signal processor for the removal of highline pickup components from a seismic trace recorded in phonographically reproducible form, which comprises:
(a) time domain filtering in said automated signal processor a pickup signal with relative amplitudes proportional to $(Y_m)$ in the matrix $(Y_m)X=Z$ to tailor the pickup trace to correspond with the pickup component in the seismic trace, where the function X is generated by autocorrelating a pickup trace having the same dominant frequency components as the pickup components in said seismic trace and the function Z is generated by crosscorrelating said pickup trace with a high gain time segment of said seismic trace, and
(b) combining in said automated signal processor the tailored pickup trace and said seismic trace with one of them reversed in phase for cancelling said pickup components from said seismic trace.

9. The method of processing seismological and seismic data in an automated signal processor to remove highline pickup components from a seismic trace recorded in phonographically reproducible form, which comprises:
(a) synthesizing a crossequalization filter uniquely related to the pickup component of the seismic trace from an autocorrelation function X of said pickup component and a crosscorrelation function Z of said pickup component to produce a set of filter weights $(Y_m)$ which satisfy the matrix $(Y_m)X=Z$,
(b) time domain filtering said pickup component with said crossequalization filter to produce a plurality of signals having relative amplitudes proportional to said filter weights,
(c) summing said plurality of signals to produce a cancellation signal, and
(d) combining said cancellation signal and said seismic trace with one of them reversed in phase for cancelling said pickup components from said seismic trace.

10. The method of claim 1 wherein said signal X, said signal Z, said seismic trace and said pickup trace are all in digital form.

11. The system of claim 4 wherein all of said automated means are digital means.

12. The method of claim 7 wherein said seismic trace, said pickup trace and all of said electrical signals are in digital form.

References Cited

UNITED STATES PATENTS 2,794,965  6/1957  Yost _____ 340—15.5

RODNEY D. BENNETT, Jr., Primary Examiner

D. C. KAUFMAN, Assistant Examiner